March 11, 1952 — R. R. RICHMOND — 2,588,764
VEGETABLE HARVESTER
Filed Dec. 11, 1947 — 5 Sheets-Sheet 1

INVENTOR.
Ralph R. Richmond
BY
Attorney

March 11, 1952 — R. R. RICHMOND — 2,588,764
VEGETABLE HARVESTER
Filed Dec. 11, 1947 — 5 Sheets-Sheet 2
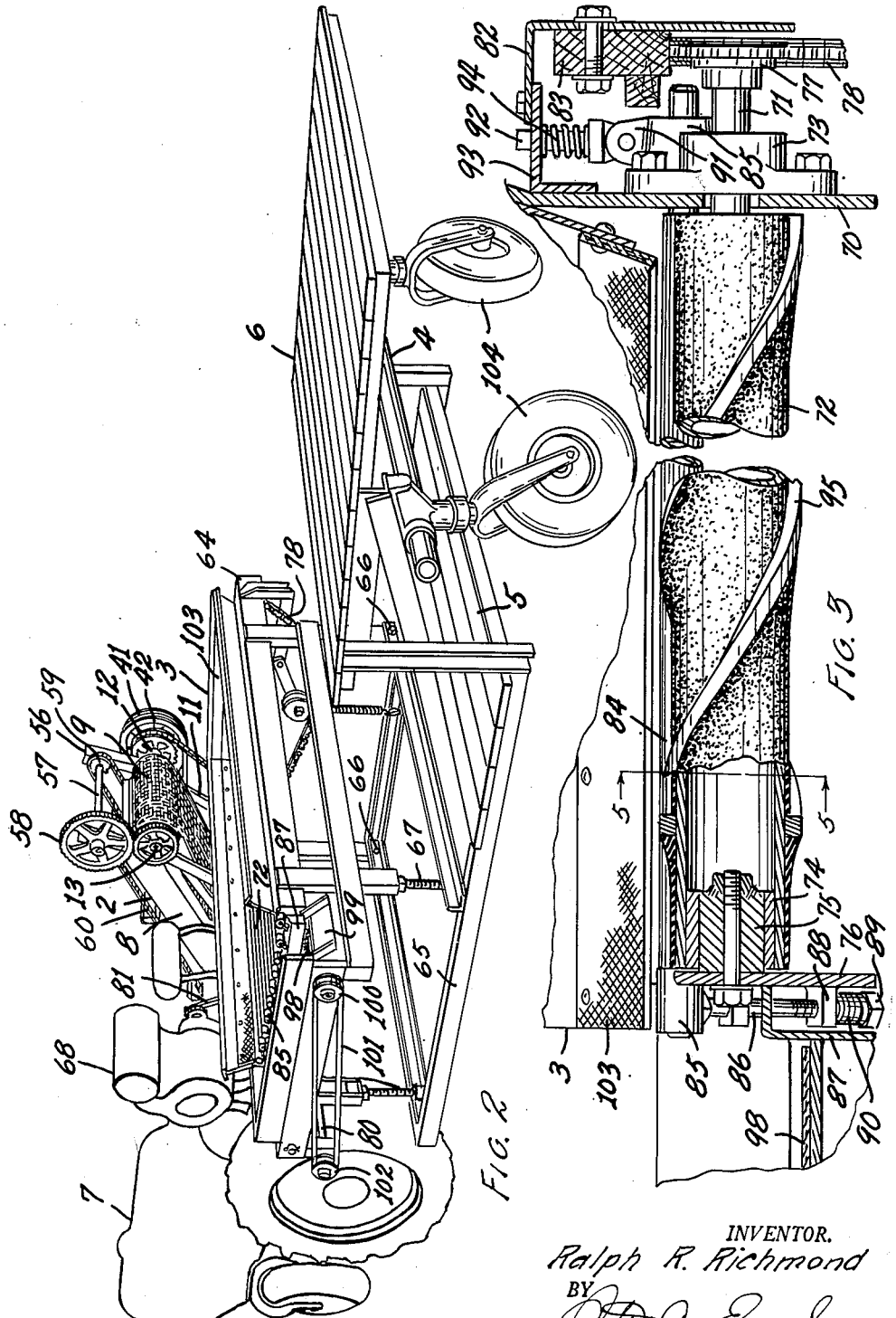
INVENTOR.
Ralph R. Richmond
BY
Attorney.

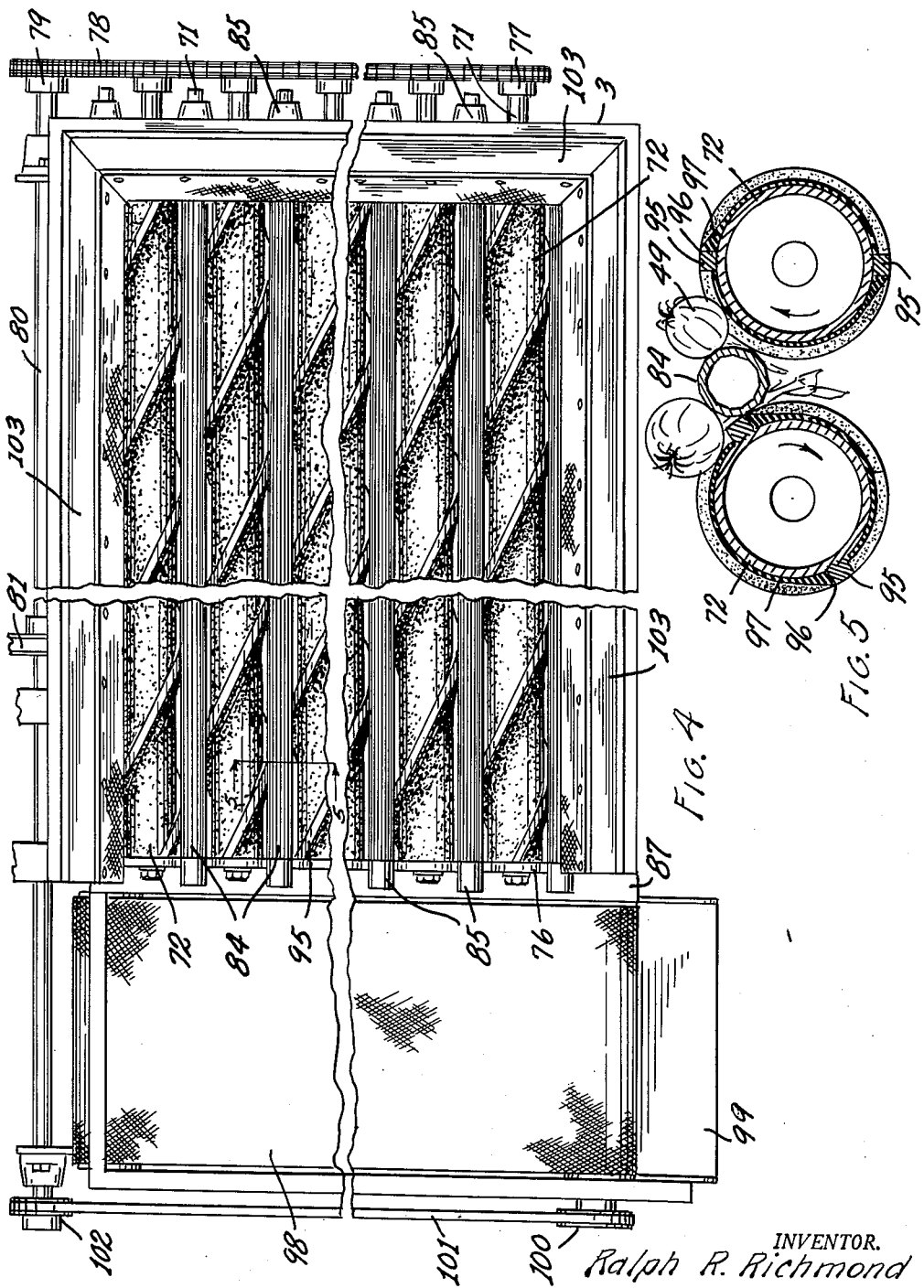

March 11, 1952 R. R. RICHMOND 2,588,764
VEGETABLE HARVESTER
Filed Dec. 11, 1947 5 Sheets-Sheet 4
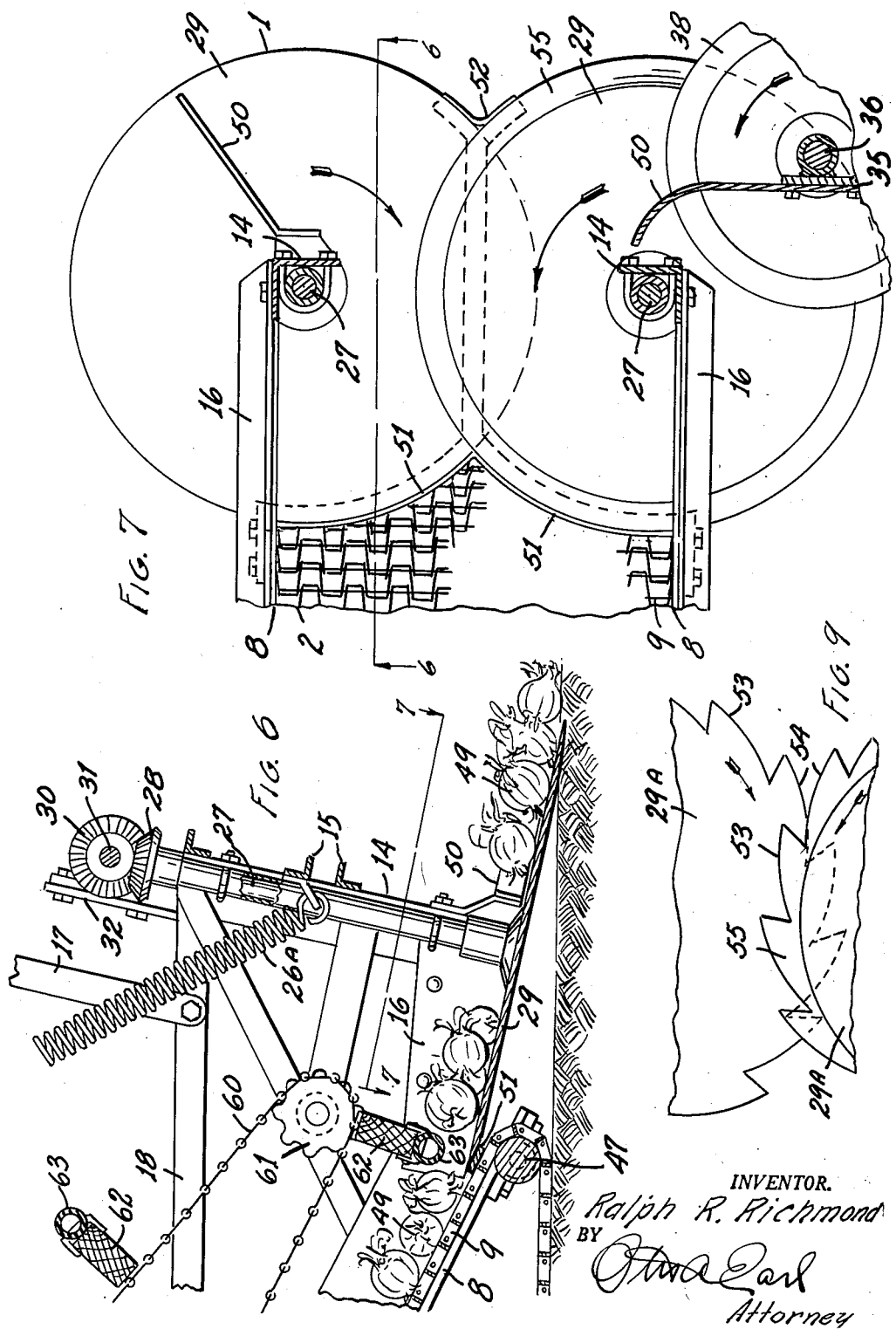
INVENTOR.
Ralph R. Richmond
BY
Attorney

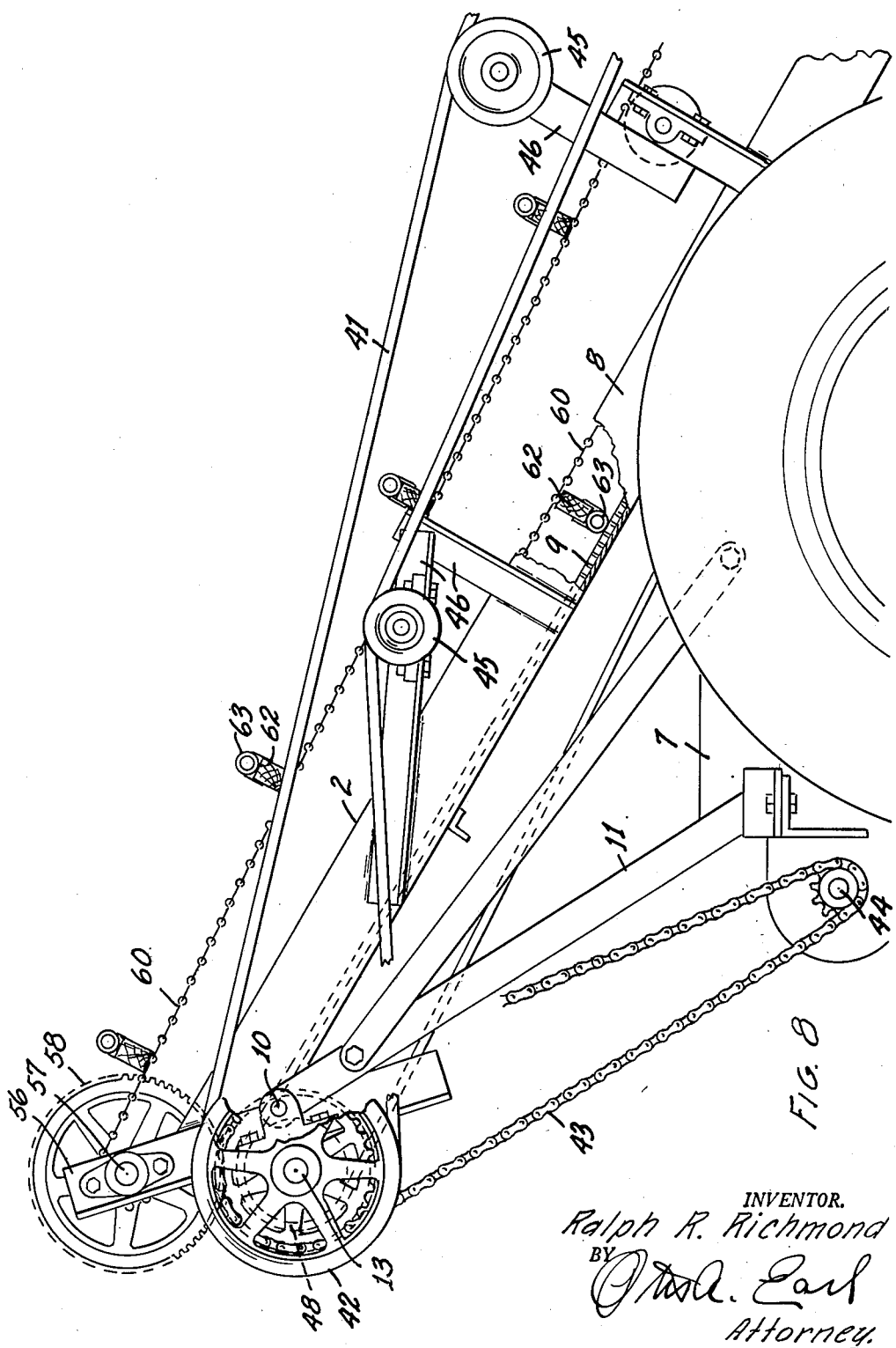

Patented Mar. 11, 1952

2,588,764

UNITED STATES PATENT OFFICE 2,588,764

VEGETABLE HARVESTER

Ralph R. Richmond, Gun Plains Township, Allegan County, Mich.

Application December 11, 1947, Serial No. 791,089

15 Claims. (Cl. 56—327)

This invention relates to improvements in a vegetable harvester.

The principal objects of this invention are:

First, to provide a harvester attachment for farm tractors which will permit two or three men to rapidly gather vegetables such as onions and pack the vegetables for shipment to market.

Second, to provide a vegetable harvester which will pick up vegetables lying on the ground and perform an initial topping operation and elevate the vegetables to a secondary cleaning and topping mechanism from which the vegetables are carried to crates, bags or other containers.

Third, to provide harvesting mechanism which is readily detachable from a standard farm tractor so that the tractor may be used for ordinary farm work.

Fourth, to provide a novel form of gathering, topping and elevating mechanism for a vegetable harvester which can be controlled by the driver of the tractor to pick up vegetables lying on the ground without damage to the vegetables and which will not become clogged or jammed by sticks, stones or other rubble in the ground.

Fifth, to provide a novel form of cleaning and topping mechanism for sphere like vegetables which will rapidly strip tops and dirt from the vegetables without injury to the vegetables and convey the clean vegetables to a delivery conveyor.

Sixth, to provide a novel form of cutter bar for a vegetable cleaning table which will maintain a sharp cutting edge for a long period of time and which will not damage vegetables passing thereover.

Seventh, to provide a novel arrangement of cutter bars and rolls for a vegetable cleaning mechanism in which the cutter bars are yieldingly mounted to maintain a fixed cutting pressure against the rolls and yet movable to pass hard foreign objects without injury to the cutting members of the mechanism.

Eight, to provide a novel form of pick-up disk for a vegetable harvester which will function to direct the vegetables into a loading conveyor and also to shear off tops on the vegetables without injury to the vegetable.

Other objects relating to details of the invention will appear from the description to follow. The invention is defined and pointed out in the claims.

In the drawings, of which there are five sheets, I illustrate a preferred form of my harvester mechanism with two forms of disks therefor.

Fig. 2 is a rear quarter perspective view of my harvester mechanism showing the relationship between the gathering and topping and cleaning sections thereof.

Fig. 3 is a fragmentary transverse cross sectional view through the topping mechanism of my harvester illustrating the mounting of the cutter rolls.

Fig. 4 is a fragmentary plan view of my topping table and the loading conveyor of my mechanism.

Fig. 5 is a fragmentary cross sectional view along the line 5—5 in Figs. 3 and 4 and illustrating the action of the cutter rolls.

Fig. 6 is a fragmentary vertical cross sectional view through the pick-up mechanism of my harvester taken along the line 6—6 in Fig. 7.

Fig. 7 is a fragmentary horizontal cross sectional view showing the relationship of my pick-up disks to the forward end of the elevating conveyor taken along the line 7—7 in Fig. 6.

Fig. 8 is a fragmentary side elevational view of the upper portion of my elevating conveyor and illustrating the supporting and driving connection between the tractor and conveyor.

Fig. 9 is a fragmentary plan view of a modified form of my pick-up disk.

Figure 1:
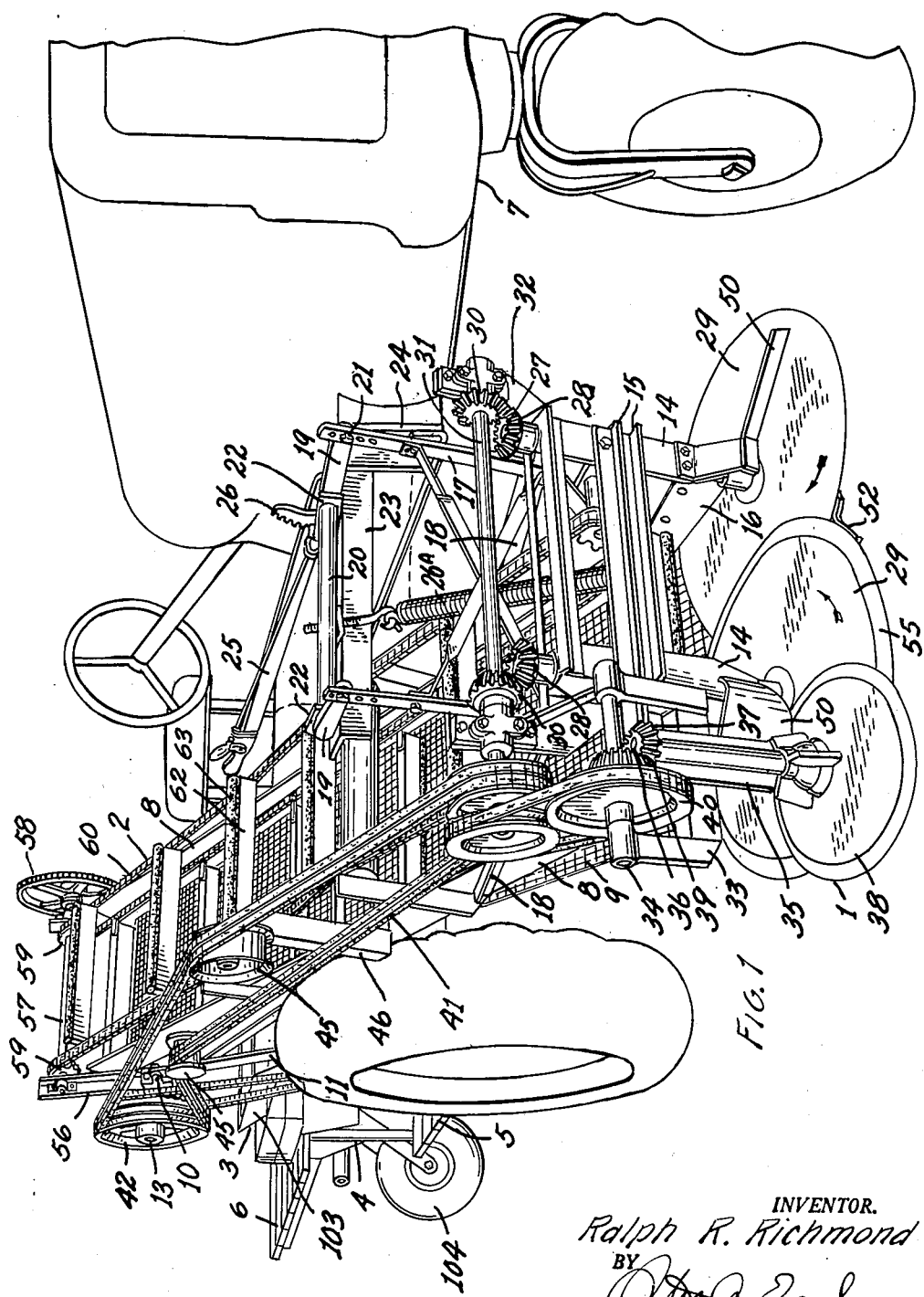
Fig. 1 is a front quarter perspective view of my harvester mechanism as mounted on a familiar type of farm tractor, parts of the tractor being illustrated in dotted lines.

My vegetable harvester is designed primarily for use in gathering onions which are commonly pulled from the ground and left in windrows for several days before being harvested. However, my harvester will function satisfactorily to reduce the cost of harvesting other vegetables such as potatoes, turnips and sugar beets.

My harvester comprises a pick-up mechanism 1, delivering to a conveyor 2 for delivery to a cleaning and topping table 3 located behind the tractor. The topping table 3, is adjustably mounted on a trailer 4 having a working platform 5 and loading or storage platform 6. All parts of my harvester are readily attachable to standard farm tractors, parts of which are indicated at 7.

Considering first the construction and operation of the gathering mechanism attention is directed to Figs. 1 and 6 to 9. The elevator 2, consists of a pair of angle members 8 secured to each other with their flanges in opposed relationship to support the upper reach of a conveyor belt 9. The upper ends of the angle members 8 are provided with pivots 10 (see Fig. 8) which are connectable to the struts 11 extending upwardly and rearwardly from the rear portion of the tractor. The angle members 8 also carry a pair of bearing brackets 12 for rotatably supporting cross shaft 13 near the upper end of the conveyor. The lower ends of the angle members 8 are connected by a generally vertical framework consisting of the uprights 14 and cross members 15. The lower ends of the angle members 8 are secured to the uprights by the extension plates 16. A lifting frame having side rods 17 is secured to the braces 18 extending rearwardly from the upper ends of the vertical frame to the vertical flanges of the angle members 8. The upper ends of the side rods 17 are adjustably secured to the crank arms 19 of a rock shaft 20 by the bolts 21. The rock shaft 20 is rotatably mounted in bearing brackets 22 secured to the top of a side arm 23 which in turn is secured to a pad 24 on the side of the tractor. An elevating lever 25 is secured to the inner end of the rock shaft and extends rearwardly to alongside the driver's seat on the tractor. The inner bearing bracket 22 is provided with a toothed segment 26 engageable with a familiar type of locking dog on the elevating lever so that the front end of the gathering mechanism may be readily raised and lowered about the pivots 10 as a center. A coil spring 26A partially balances the weight of the front end of the conveyor.

The uprights 14 of the vertical frame rotatably support a pair of main shafts 27 having beveled gears 28 on the upper ends thereof. The lower ends of the main shafts are provided with disks 29, one of which is lapped upon the top of the other in closely spaced sliding relationship. In the lowered position of the gathering mechanism, the disks are slightly inclined forwardly as shown. The main shafts and beveled gears 28 are driven in opposite directions by the beveled gears 30 mounted on a cross shaft 31. The cross shaft 31 is journaled in suitable bearings carried by the brackets 32 on the upper ends of the uprights 14. An auxiliary bracket 33 extending forwardly and laterally from the outer upright 14 carries a second cross shaft 34 and a post 35. The post 35 serves to rotatably support the auxiliary disk shaft 36 with a beveled gear 37 on the top thereof. The lower end of the shaft 36 carries an auxiliary disk 38 over-lying the outer side of the outer main disk 29. The auxiliary shaft and beveled gear 37 are driven from the shaft 34 by a beveled gear 39 and pulley 40. The pulley 40 is belt driven from a pulley on the outer end of the cross shaft 31.

The cross shaft 31 is driven through the belts 41 from a pulley 42 secured to the end of the shaft 13 and the shaft 13 is driven by a chain 43 connected to a sprocket on the power take-off shaft 44 of the tractor (see Fig. 8). Idler pulleys 45 are carried by suitable struts and braces 46 on the angle members 8 so that the belt 41 will clear the wheel of the tractor.

The lower end of the conveyor belt 9, which is of open link construction, is rotatably carried by the cross shaft 47 carried on the lower ends of the angle members 8 underneath the rear of the disks 29. The upper end of the loading conveyor is rotatable about a suitable drum 48 carried on the shaft 13. It will thus be seen that as the tractor is driven over a field the front end of the elevator mechanism may be lowered until the disks 29 and 38 dig slightly into the ground ahead of the conveyor belt 9 as is most clearly shown in Fig. 6. The disks and conveyor belt will be driven from the power take-off shaft of the tractor so that as onions or other vegetables indicated at 49 are picked up on the disks they will be carried between the main shafts 27 to the conveyor 9. Suitable guards 50 extend from the uprights 14 to prevent onions from spilling over to the outer sides of the disks and being missed by the harvester. The auxiliary disk 38 serves to widen the swath covered by the pick-up mechanism.

I provide a blocking arm 51 connected to the forward ends of the angle members 8 and extending forwardly underneath the main disks and having an upturned flange 52 lying along the joining edge of the main disks to prevent the entry of sticks and stones between the disks. (See Figs. 1 and 7.)

In the modified form of disk 29A illustrated in Fig. 9, I have provided a series of teeth 53 which are sloped or pitched rearwardly from the direction of rotation of disks 29 so that the sloped edges of the teeth are made to form a succession of cutting jaws as at 54 to shear off any tops on the vegetables which may fall or work their way between the meeting edges of the disks. Note that the upper edge of the outer and upper disk is beveled as at 55 in both forms of the disk to provide a sharp cutting edge between the two disks.

Projecting above the upper ends of the angle members 8 are a pair of arms 56 rotatably supporting a shaft 57 across the upper end of the conveyor. The shaft 57 is driven by means of the gear 58 from a mating gear on the shaft 13. The shaft 57 carries a pair of sprockets 59 rotatably supporting the upper ends of a pair of chain loops 60. The lower ends of the chain loops 60 are carried around sprockets 61 mounted on the braces of the vertical frame members 14 just above the lower end of the conveyor 9. The chains 60 carry a series of flights 62 in the form of follower bars provided with tubular rubber or other pads 63 on the outer edge thereof. The gear 58 and chains 60 are driven at a slightly slower speed than the conveyor so that as onions are carried upwardly on the conveyor 9 there will be a cleaning and rubbing action of the conveyor on the onions as they tend to roll backwardly against the slower moving flights 62.

Turning now to the construction and operation of the cleaning table and loading platform of my harvester, attention is directed to Figs. 2 to 5. In Fig. 2 the upper end of the conveyor 9 is illustrated as discharging on the right hand end of the cleaning table 3. The cleaning table 3 consists of a suitable framework 64 which is pivotally supported on the right edge of the framework 65 at 66. The left side of the table 3 is adjustably supported on the framework 65 by the screws 67. Adjustment of the angle of the table is necessary because some vegetables, particularly onions, travel across the table at different speeds, depending upon whether they are relatively wet or dry. The forward edge of the framework 64 is arranged to support an auxiliary gasoline engine of the air cooled type indicated at 68 alongside of and slightly to the rear of the driver's seat.

More specifically the right side of the cleaning table 3 consists of a plate 70 having a series of apertures therethrough arranged to pass a series of shafts 71 of the cutter rolls 72. Self-aligning bearings 73 are secured to the outside of the plate 70 for supporting the rolls and shafts. The left ends of the rolls 72 are provided with pressed bushings 74 rotatably received on the stud bearings 75 secured to the left side plate 76. The right ends of the shafts 71 are provided with sprockets 77 engageable with a chain 78. The chain 78 is driven from a sprocket 79 on the right end of a cross shaft 80 along the front edge of the cleaning table and in turn belt driven from the motor 68 by the belt 81. (See Figs. 2 and 4.) The chain 78 and sprockets 77 are enclosed by a guard housing 82 which also serves to support a block 83 for holding the chain in engagement with the sprockets 77. It will thus be seen that the rolls 72 are all arranged to be rotated in the same direction by the motor 68.

Positioned between the cutter rolls 72 are a series of shear bars 84 which are supported at their ends by the bearings 85. The bearings at the left ends of the bars 84 are supported upon pins or bolts 86 (see Fig. 3) extending downwardly through the angle bar 87 and bosses 88 which extend outwardly from the left side of plate 76. A nut 89 is adjustably secured to the lower ends of the bolts 86 to adjust the compression of the coil springs 90. The left ends of the bars 84 are thus yieldingly drawn down between the two adjacent cutter rolls so as to have cutting engagement with the cutter rolls.

The bearings 85 on the right ends of the shear bars are provided with yokes 91 pivotally connected to tongues on the lower ends of guide pins 92 which extend upwardly through appropriately located holes in the angle bar 93 secured to the outside of the right side plate 70. The angle bar 93 also serves to support the cover member 82. Springs 94 are positioned around the guide pins 92 to bear against the underside of the angle bar 93. The right ends of the bars 84 are thus also spring urged to engage the bars with the cutter rolls.

Each of the cutter rolls 72, which are of hollow tubular construction, are provided with a pair of spiral ribs 95 which are welded or otherwise suitably secured to the surface of the roll. The ribs 95 are generally rectangular in cross section and have their leading edges 96 ground off sharply to form a cutting edge cooperative with the shear bars 84 as is most clearly illustrated in Fig. 5. I prefer to make the bars of tubular stock of multi-sided cross section, thus the bars are substantially cylindrical but present a series of new cutting edges to the ribs 96 as the bars revolve. As is most clearly illustrated in Fig. 4, I prefer to position the several cutter rolls in angularly displaced relationship so that the ribs of one roll are displaced 90° from the ribs on the next adjacent rolls.

In order to prevent unnecessary bruising and cutting of the vegetables as they are passed over the topping table, I cover the body of the cutter rolls 72 with a layer of relatively soft rubber like material such as asphaltum. I taper the thickness of the covering from a thin layer adjacent to the trailing edge of the ribs 96 to approximately the full thickness of the ribs along the leading edge of the ribs as is indicated at 97 in Figs. 3, 4, and 5, then as the cutting edge approaches the bars 84, the vegetables will be lifted out of the notch or groove formed between the bars and cutter rolls so as not to bruise or cut the surfaces of the vegetables as the vegetables are advanced to the left along the topping table. Any tops or loose skins on the vegetables will work their way between the cutter rolls and bars and will be effectively sheared off leaving the vegetables cleaned and topped and in condition highly acceptable to the commercial market.

The left end of the framework of the topping table is provided with a longitudinally disposed delivery conveyor 98 which catches the vegetables discharged from the topping table and delivers them to a loading chute 99. The delivery conveyor 98 is driven from a pulley 100 by the belt 101 connected to the pulley 102 on the left end of the cross shaft 80. The delivery conveyor is thus driven in timed relationship with the rolls of the topping table. An operator standing on the working platform 5 can supervise the operation of the topping table and position crates or bags underneath the delivery chute 99 to catch the cleaned vegetables. As each container is filled, it can be lifted to the loading platform 6 for easy transfer to a truck or wagon without stopping the harvester.

I provide outwardly sloping hopper like wall 103 around three sides of the topping table to retain the vegetables on the topping rolls. The rear framework 65 is conveniently supported by the castor wheels 104 and is connected to the tractor by a transverse horizontal hinge (not illustrated) so that the tractor and topper may negotiate uneven ground while at the same time turning as a unit.

While the pick up mechanism described is not particularly suited for harvesting carrots due to their elongated shape, the cleaning table operates to clean and top carrots and similar shaped vegetables in a rapid and efficient manner.

I have thus described a highly practical and efficient form of my harvester so that others may reproduce and operate the same without further disclosure.

Having thus described my invention, what I claim as new and desire to secure by Letters Patent, is:

1. Vegetable harvesting mechanism for attachment to a tractor comprising, an inclined framework removably and pivotally mounted near the rear and along one side of the tractor and extending forwardly and downwardly to adjacent to the ground, a conveyor belt of link construction having its upper reach supported upon said inclined framework, a cross shaft carried by the upper end of said inclined framework for rotating said conveyor belt, means for driving said shaft from a power take-off connection of said tractor, a generally vertical framework secured to the front end of said inclined framework, means including a manually operable rocker shaft secured to the side of said tractor and connected to said vertical framework for adjustably supporting the said vertical framework, a pair of generally vertical shafts mounted on said vertical framework, a pair of disks secured to the lower ends of said vertical shafts and lapped one upon the other, the rear edges of said disks being disposed above the lower end of said conveyor belt, a blocking bar projecting from the lower end of said inclined framework beneath said disks and having an upturned flange on the forward edge thereof disposed between the meeting edges of said disks, a second cross shaft carried by said vertical framework and arranged to drive said vertical shafts in opposite rearwardly diverging directions, belt means for driving said second shaft from said first shaft, front and rear cross shafts mounted at the top and bottom of said inclined framework and above said conveyor, a pair of chain loops carried by said front and rear shafts, flights of follower bars carried by said chain loops, the flights on the lower reaches of said chain loops being translatable along the upper reach of said conveyor belt, and gear means for driving one of said front and rear shafts from said first shaft and at a slower speed than said first shaft.

2. Vegetable harvesting mechanism for attachment to a tractor comprising, an inclined framework removably and pivotally mounted near the rear and along one side of the tractor and extending forwardly and downwardly to adjacent to the ground, a conveyor belt of link construction having its upper reach supported upon said inclined framework, a cross shaft carried by the upper end of said inclined framework for rotating said conveyor belt, means for driving said shaft from a power take-off connection of said tractor, a generally vertical framework secured to the front end of said inclined framework, means including a manually operable rocker shaft secured to the side of said tractor and connected to said vertical framework for adjustably supporting the said vertical framework, a pair of generally vertical shafts mounted on said vertical framework, a pair of disks secured to the lower ends of said vertical shafts and lapped one upon the other, the rear edges of said disks being disposed above the lower end of said conveyor belt, teeth formed on the edges of said disks and sloped oppositely to the direction of rotation of said disks, a second cross shaft carried by said vertical framework and arranged to drive said vertical shafts in opposite rearwardly diverging directions, belt means for driving said second shaft from said first shaft, front and rear cross shafts carried above the upper and lower ends of said inclined framework and above said conveyor, a pair of chain loops carried by said front and rear shafts, flights of follower bars carried by said chain loops, the flights on the lower reaches of said chain loops being translatable along the upper reach of said conveyor belt, and gear means for driving one of said front and rear shafts from said first shaft and at a slower speed than at said first shaft.

3. Pick up mechanism for a vegetable harvesting device comprising, an inclined framework, a support frame removably secured to the rear of said tractor and on one side thereof, said support frame and inclined framework having a pivotal connection at the rear ends thereof, a conveyor belt of link construction having its upper reach supported on said inclined framework, a shaft for rotating said conveyor belt, means for driving said shaft from the power take-off connection of said tractor, a generally vertical framework secured to the lower end of said inclined framework, a side arm removably secured to the side of said tractor, a rock shaft mounted on said side arm and having cranks extending forwardly therefrom, a lifting framework adjustably connecting said vertical framework with said cranks, an operating handle secured to said rock shaft and extending to adjacent the driver's position on said tractor, a pair of upright shafts supported by said generally vertical framework, a cross shaft for rotating said pair of shafts in opposite directions, belt means for driving said cross shaft from said first shaft, disks carried at the lower ends of said pair of shafts and having their rear edges disposed over the lower end of said conveyor belt, said disks having their center portions overlapped in closely spaced relationship, a blocking bar secured to the forward end of said inclined framework and extending forwardly underneath said disks, an upturned V-shaped flange on said blocking bar positioned between the leading edges of said disks, a pair of chain loops extending along the upper side of said conveyor belt, flights of follower bars carried by said chain loops, means for rotating said chain loops at a slower speed than said conveyor belt, and baffles extending radially outwardly across the outer portions of said disks.

4. Pick up mechanism for a vegetable harvesting device comprising, an inclined framework, a support frame removably secured to the rear of said tractor and on one side thereof, said support frame and inclined framework having a pivotal connection at the rear ends thereof, a conveyor belt of perforate construction having its upper reach supported on said inclined framework, a shaft for rotating said conveyor belt, means for driving said shaft from the power take-off connection of said tractor, a generally vertical framework secured to the lower end of said inclined framework, a side arm removably secured to the side of said tractor, a rock shaft mounted on said side arm and having cranks extending therefrom, links adjustably connecting said vertical framework with said cranks, an operating handle secured to said rock shaft and extending to adjacent the driver's position on said tractor, a pair of upright shafts supported by said generally vertical framework, a cross shaft for rotating said pair of shafts in opposite directions to diverge to the rear of said tractor, means for driving said cross shaft from said first shaft, disks carried at the lower end of said pair of shafts and having their rear edges disposed over the lower end of said conveyor belt, said disks having their center portions overlapped in closely spaced relationship, a blocking bar secured to the forward end of said inclined framework and extending forwardly underneath said disks, an upturned V-shaped flange on said blocking bar positioned between the leading edges of said disks, a pair of chain loops extending along the upper side of said conveyor belt, flights of follower bars carried by said chain loops, and means for rotating said chain loops at a slower speed than said conveyor belt.

5. Pick up mechanism for a vegtable harvesting device comprising, an inclined framework, a support frame removably secured to the rear of said tractor and on one side thereof, said support frame and inclined framework having a pivotal connection at the rear ends thereof, a conveyor belt of perforate construction having its upper reach supported on said inclined framework, a shaft for rotating said conveyor belt, means for driving said shaft from the power take-off connection of said tractor, a generally vertical framework secured to the lower end of said inclined framework, a side arm removably secured to the side of said tractor, a rock shaft mounted on said side arm and having cranks extending therefrom, links adjustably connecting said vertical framework with said cranks, an operating handle secured to said rock shaft and extending to adjacent the driver's position on said tractor, a pair of upright shafts supported by said generally vertical framework, a cross shaft for rotating said pair of shafts in opposite directions to diverge to the rear of said tractor, means for driving said cross shaft from said first shaft, disks carried at the lower ends of said pair of shafts and having their rear edges disposed over the lower end of said conveyor belt, said disks having their center portions over-lapped in closely spaced relationship, teeth formed on the edges of said disks and inclined oppositely from the direction of rotation of said disks, a pair of chain loops extending along the upper side of said conveyor belt, flights of follower bars carrier by said chain loops, and means for rotating said chain loops at a slower speed than said conveyor belt.

6. Pick up mechanism for a vegetable harvesting device comprising, an inclined framework, a support frame removably secured to said tractor and on one side thereof, said support frame and inclined framework having a pivotal connection at the rear ends thereof, a conveyor belt having its upper reach supported on said inclined framework, a shaft for rotating said conveyor belt, means for driving said shaft from the power take-off connection of said tractor, a generally vertical framework secured to the lower end of said inclined framework, a side arm removably secured to the side of said tractor, a rock shaft mounted on said side arm and having cranks extending therefrom, means connecting said inclined framework with said cranks for vertical adjustment thereby, an operating handle secured to said rock shaft and extending to adjacent the driver's position on said tractor, a pair of upright shafts supported by said generally vertical framework, a cross shaft for rotating said pair of shafts in opposite directions to diverge to the rear of said tractor, means for driving said cross shaft from said first shaft, disks carried at the lower ends of said pair of shafts and having their edges disposed over the lower end of said conveyor belt, said disks having their center portions overlapped in closely spaced relationship, a blocking bar secured to the forward end of said inclined framework and extending forwardly underneath said disks, an upturned V-shaped flange on said blocking bar positioned between the leading edges of said disks, a pair of chain loops extending along the upper side of said conveyor belt, flights of follower bars carried by said chain loops, and means for rotating said chain loops at a slower speed than said conveyor belt.

7. Pick up mechanism for a tractor operated vegetable harvesting device comprising a pair of generally vertical shafts, a drive shaft for rotating said pair of shafts in rearwardly diverging directions, disks secured to the lower ends of said pair of shafts, one of said disks partially overlying the other, a frame adapted to support said shafts and said disks from the tractor with the disks tilted slightly forwardly from the horizontal and with their front edges in shallow penetrating engagement with the ground, teeth formed on the edges of said disks and opening rearwardly of the rotation thereof and rotatable therewith to form successive shearing notches between the joining edges of said disks, and deflector arms carried above said disks and diverging forwardly across the tops of said disks.

8. Pick up mechanism for a tractor operated vegetable harvesting device comprising a pair of generally vertical shafts, a drive shaft for rotating said shafts in rearwardly diverging directions, disks secured to the lower ends of said shafts, one of said disks partially overlying the other, a frame adapted to support said shafts and said disks from the tractor with the disks tilted slightly forwardly from the horizontal and with their front edges in shallow penetrating engagement with the ground, teeth formed on the edge of one of said disks and opening rearwardly of the rotation thereof and rotatable therewith to form successive shearing notches between the joining edges of said disks.

9. In a machine of the class described the combination with a carriage, of a conveyor frame mounted on said carriage for vertical adjustment of the front end of the frame, a forwardly inclined conveyor carried by said frame, main pickup disks mounted on said conveyor frame at front end of said conveyor in a forwardly inclined position with their rear portions overlapping the front end of the conveyor to deliver thereto and with their adjacent edges in lapping relation, means for driving said disks with the adjacent portions thereof traveling rearwardly, an auxiliary pickup disk disposed to extend laterally beyond one of said main disks and overlapping a portion thereof and rotating in the same direction as the disk which it overlaps, and a deflector disposed above the auxiliary disk to direct objects picked up thereby to the rearwardly traveling portion of the main disk overlapped by the auxiliary disk.

10. In a machine of the class described the combination with a carriage, of a conveyor frame mounted on said carriage for vertical adjustment of the front end of the frame, a forwardly inclined conveyor carried by said frame, pickup disks mounted on said conveyor frame at the front end of said conveyor in a forwardly inclined position with their rear portions overlapping the front end of the conveyor to deliver thereto and with their adjacent edges in lapping relation, and means for driving said disks with the adjacent portions thereof traveling rearwardly, said disks being vertically adjustable with said frame till their leading edges touch the ground.

11. In a machine of the class described the combination with a carriage, of a conveyor frame mounted on said carriage for vertical adjustment of the front end of the frame, a forwardly inclined conveyor carried by said frame, pickup disks mounted on said conveyor frame at the front end of said conveyor in a forwardly inclined position with their rear portions overlapping the front end of the conveyor to deliver thereto and with their adjacent edges in lapping relation, means for driving said disks with the adjacent portions thereof traveling rearwardly, a guard comprising a V-shaped nose portion disposed to project forwardly beyond the meeting edges of the disks, a support bar extending rearwardly from said nose portion and disposed below and closely adjacent to the under-lapping disk, and curved support arms for the rear end of said bar disposed between the conveyor and the disks and projecting rearwardly of the rear edge portions of the disks overlying the conveyor.

12. In a machine of the class described the combination of a forwardly inclined conveyor, main pickup disks mounted in a forwardly inclined position with their rear portions overlapping the front end of the conveyor to deliver thereto, the adjacent edges of said main disks being in lapping relation and traveling rearwardly, an auxiliary pickup disk disposed to extend laterally of one of said main disks and overlapping a portion thereof and rotating in the same direction as the disk which it overlaps, and a deflector disposed above the auxiliary disk to direct objects picked up thereby to the rearwardly traveling portion of the main disk overlapped by the auxiliary disk.

13. In a machine of the class described the combination with a carriage, of a conveyor mounted thereon, pickup disks mounted at the front end of said conveyor in a forwardly inclined position with their rear portions overlapping the front end of the conveyor to deliver thereto and with their adjacent edges in lapping relation, means for driving said disks with the adjacent portions thereof traveling rearwardly, a V-shaped guard disposed to project forwardly beyond the meeting edges of the disks, and curved guards disposed between the conveyor and the rear edge portions of the disks overlying the conveyor.

14. In a machine of the class described the combination with a carriage, of a conveyor mounted thereon, pickup disks mounted at the front end of said conveyor with their rear portions overlapping the front end of the conveyor to deliver thereto and with their adjacent edges in lapping relation, means for driving said disks with the adjacent portions thereof traveling rearwardly, a V-shaped guard disposed to project forwardly beyond the meeting edges of the disks, and curved guards disposed between the conveyor and the rear edge portions of the disks overlying the conveyor.

15. In a machine of the class described the combination with a carriage, of a conveyor mounted thereon, pickup disks mounted at the front end of said conveyor with their rear portions overlapping the front end of the conveyor to deliver thereto and with their adjacent edges in lapping relation, and means for driving said disks with the adjacent portions thereof traveling rearwardly, said disks being inclined forwardly with their front edges touching the ground.

RALPH R. RICHMOND.

REFERENCES CITED

The following references are of record in the file of this patent:

UNITED STATES PATENTS

| Number | Name | Date |
|---|---|---|
| Re. 15,914 | Luce | Sept. 9, 1924 |
| 1,124,059 | Piper | Jan. 5, 1915 |
| 1,128,504 | Pittman | Feb. 16, 1915 |
| 1,256,642 | Barber | Feb. 19, 1918 |
| 1,630,598 | Barber | May 31, 1927 |
| 1,748,745 | Zuckerman | Feb. 25, 1930 |
| 1,859,980 | Mueller | May 24, 1932 |
| 1,901,099 | Hale | Mar. 14, 1933 |
| 2,096,588 | King | Oct. 19, 1937 |
| 2,102,379 | Nutter | Dec. 14, 1937 |
| 2,289,015 | Jackson | July 7, 1942 |
| 2,406,976 | Walz et al. | Sept. 3, 1946 |
| 2,463,447 | Walz et al. | Mar. 1, 1949 |